United States Patent
Dalla Betta et al.

(10) Patent No.: US 8,074,443 B2
(45) Date of Patent: Dec. 13, 2011

(54) PRE-COMBUSTOR AND LARGE CHANNEL COMBUSTOR SYSTEM FOR OPERATION OF A FUEL REFORMER AT LOW EXHAUST TEMPERATURES

(75) Inventors: Ralph Albert Dalla Betta, Mountainview, CA (US); Joel M. Cizeron, Sunnyvale, CA (US); David R. Sheridan, Menlo Park, CA (US)

(73) Assignee: Eaton Corporation, Cleveland, OH (US)

( * ) Notice: Subject to any disclaimer, the term of this patent is extended or adjusted under 35 U.S.C. 154(b) by 1062 days.

(21) Appl. No.: 11/983,909

(22) Filed: Nov. 13, 2007

(65) Prior Publication Data

US 2009/0120072 A1    May 14, 2009

(51) Int. Cl.
*F01N 3/00* (2006.01)
(52) U.S. Cl. ............... 60/286; 60/274; 60/295; 60/301; 60/303
(58) Field of Classification Search ............... 60/276, 60/286, 295, 301, 303
See application file for complete search history.

(56) References Cited

U.S. PATENT DOCUMENTS

| | | |
|---|---|---|
| 4,154,568 A | 5/1979 | Kendall et al. |
| 6,087,298 A | 7/2000 | Sung et al. |
| 7,181,906 B2 * | 2/2007 | Dalla Betta et al. ............ 60/286 |
| 7,240,483 B2 | 7/2007 | Cizeron et al. |
| 2004/0050037 A1 | 3/2004 | Betta et al. |
| 2006/0179822 A1 | 8/2006 | Dalla Betta |

FOREIGN PATENT DOCUMENTS

| WO | 2004046514 A1 | 6/2004 |
|---|---|---|
| WO | 2007014316 A2 | 2/2007 |

* cited by examiner

*Primary Examiner* — Thomas Denion
*Assistant Examiner* — Diem Tran
(74) *Attorney, Agent, or Firm* — Paul V. Keller (57) ABSTRACT

An exhaust aftertreatment system is provided with a large channel combustor, a fuel reformer, and a lean $NO_X$ trap. The lean $NO_X$ trap is denitrated by steps comprising: heating the fuel reformer to steam reforming temperatures by introducing vaporized fuel to the large channel combustor and combusting a portion of the vaporized fuel under lean conditions, then making the exhaust-injected fuel mixture overall rich, whereby the fuel reformer produces syn gas that denitrates the lean $NO_X$ trap. The fuel reformer has a low thermal mass, whereby it is designed to heat to at least about 500° C. and catalyze steam reforming reaction with each denitration. The large channel combustor is a monolith having an average channel size larger than the fuel reformer and a thermal mass no more than about 20% that of the fuel reformer, whereby the large channel combustor facilitates low temperature startup of the fuel reformer.

28 Claims, 1 Drawing Sheet

Figure

PRE-COMBUSTOR AND LARGE CHANNEL COMBUSTOR SYSTEM FOR OPERATION OF A FUEL REFORMER AT LOW EXHAUST TEMPERATURES

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_X$ emissions. In diesel-powered vehicles, which use compression ignition, the exhaust is generally too oxygen-rich for three-way catalysts to be effective.

Several solutions have been proposed for controlling $NO_X$ emissions from diesel-powered vehicles. One set of approaches focuses on the engine. Techniques such as exhaust gas recirculation and partially homogenizing fuel-air mixtures are helpful, but these techniques alone will not eliminate $NO_X$ emissions. Another set of approaches remove $NO_X$ from the vehicle exhaust. These include the use of lean-burn $NO_X$ catalysts, selective catalytic reduction (SCR) catalysts, and lean $NO_X$ traps (LNTs).

Lean-burn $NO_X$ catalysts promote the reduction of $NO_x$ under oxygen-rich conditions. Reduction of $NO_X$ in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean $NO_X$ reduction, introducing a fuel economy penalty of 3% or more. Currently, peak $NO_X$ conversion efficiencies for lean-burn $NO_X$ catalysts are unacceptably low.

SCR generally refers to selective catalytic reduction of $NO_X$ by ammonia. The reaction takes place even in an oxidizing environment. The $NO_X$ can be temporarily stored in an adsorbent or ammonia can be fed continuously into the exhaust. SCR can achieve high levels of $NO_X$ reduction, but there is a disadvantage in the lack of infrastructure for distributing ammonia or a suitable precursor. Another concern relates to the possible release of ammonia into the environment.

LNTs are devices that adsorb $NO_X$ under lean conditions and reduce and release the adsorbed $NO_X$ under rich conditions. An LNT generally includes a $NO_X$ adsorbent and a catalyst. The adsorbent is typically an alkali or alkaline earth compound, such as $BaCO_3$ and the catalyst is typically a combination of precious metals including Pt and Rh. In lean exhaust, the catalyst speeds oxidizing reactions that lead to $NO_X$ adsorption. In a reducing environment, the catalyst activates reactions by which hydrocarbon reductants are converted to more active species, the water-gas shift reaction, which produces more active hydrogen from less active CO, and reactions by which adsorbed $NO_X$ is reduced and desorbed. In a typical operating protocol, a reducing environment will be created within the exhaust from time-to-time to regenerate (denitrate) the LNT.

Regeneration to remove accumulated $NO_x$ may be referred to as denitration in order to distinguish desulfation, which is carried out much less frequently. The reducing environment for denitration can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, when valves are not used, a portion of the reductant is generally expended to consume excess oxygen in the exhaust. The reducing agent reacts with oxygen and substantially consumes it. The reactions between reductant and oxygen can take place in the LNT, but it is generally preferred for the reactions to occur in a catalyst upstream of the LNT, whereby the heat of reaction does not cause large temperature increases within the LNT at every regeneration. To lessen the amount of excess oxygen and reduce the amount of reductant expended consuming excess oxygen, the engine may be throttled, although such throttling may have an adverse effect on the performance of some engines.

WO 2004/090296 describes a diesel automotive exhaust treatment system with a fuel reformer configured within an exhaust line upstream from LNT and SCR catalysts. The reformer has a high thermal mass. The reformer uses Pt and Rh to produce syn gas from diesel fuel at exhaust gas temperatures. For the reformer to be operative at exhaust gas temperatures, a relatively large amount of catalyst must be used to provide enough catalyst activity. The reformer both removes excess oxygen and converts the diesel fuel reductant into more reactive reformate U.S. Pat. Pub. No. 2004/0050037 (hereinafter "the '037 publication") describes a different type of fuel reformer placed in the exhaust line upstream from an LNT. The reformer includes both oxidation and steam reforming catalysts. Pt and/or Pd serves as the oxidation catalyst. Rh serves as the reforming catalyst. The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby the injected fuel combusts to generate heat. After warm up, the fuel injection rate is increased and or the oxygen flow rate reduced to provide a rich exhaust.

Designing the fuel reformer to heat and operate at least partially through steam reforming reactions as opposed to operating at exhaust stream temperatures reduces the catalyst requirement, increases the reformate yield, and reduces the amount of heat generation. In principal, if reformate production proceeds through partial oxidation reforming as in the reaction:

$$CH_{1.85} + 0.5\ O_2 \rightarrow CO + 0.925\ H_2 \qquad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925\ H_2 \qquad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust.

Nevertheless, the benefits are sufficient that a low thermal mass reformer that must be preheated to operate effectively is preferred over a large thermal mass reformer that does not require preheating.

Starting the inline reformer of the '037 publication from low exhaust temperatures can be difficult. The minimum exhaust temperature from which the reformer can be warmed and denitration initiated using exhaust line fuel injection is often an important design consideration. The minimum start-up temperature can be lowered to a certain extent by selecting appropriate catalysts, but there are limits to what can be achieved using that approach.

U.S. Pat. No. 7,240,483 describes a pre-combustion catalyst (PCC) that can be used to improve the performance of the inline reformer of the '037 publication and somewhat lower its light-off temperature. The PCC is a small monolith comprising an oxidation catalyst and configured within the exhaust line upstream from the fuel reformer. The oxidation catalyst may coat only a fraction of the monolith passages. The PCC is functional to oxidize a portion of the injected fuel and vaporize most or all of the remaining fuel. The vaporized fuel and exhaust mix to a high degree before entering the fuel reformer.

The PCC does not heat the exhaust to any great extent and is primarily functional to intimately combine the fuel and exhaust. This mixing lowers the reformer light-off temperature, but it has still proven difficult to startup the PCC-reformer system when the exhaust is below about 240° C. Even when the system does light-off, the warm-up process can be slow, which negatively impacts both emission control performance and fuel penalty.

In spite of advances, there continues to be a long felt need for an affordable and reliable diesel exhaust aftertreatment system that is durable, has a manageable operating cost (including fuel penalty), and reduces $NO_X$ emissions to a satisfactory extent in the sense of meeting U.S. Environmental Protection Agency (EPA) regulations effective in 2010 and other such regulations that will limit $NO_x$ emissions from trucks and other diesel-powered vehicles. Manufacturers and researchers have put considerable effort toward meeting those regulations.

SUMMARY

One of the inventors' concepts relates to a power generation system comprising a diesel engine, a pre-combustor, a large channel combustor, a fuel reformer, and a lean $NO_X$ trap configured in that order with respect to the exhaust flow. For denitration of the lean $NO_X$ trap, the pre-combustor is operative to combust a first portion of the injected fuel and to vaporize another portion of the injected fuel. The vaporized fuel mixes with the exhaust between the pre-combustor and the large channel combustor. The large channel combustor is designed to combust a portion of the fuel, heating the exhaust and heating the fuel reformer. The large channel combustor has an average channel size larger than that of the fuel reformer and a thermal mass no more than about 20% that of the fuel reformer, by which the large channel combustor is able to accelerate the fuel reformer heating rate in comparison to a system without the large channel combustor. The fuel reformer has a low thermal mass, whereby it is designed to heat to at least about 500° C. and catalyze steam reforming reactions with each denitration of the lean $NO_X$ trap. The large channel combustor can not only accelerate the fuel reformer heating rate but can reduce the breakthrough of unburned hydrocarbons during warm-up from a given exhaust temperature and lower the minimum exhaust temperature from which the fuel reformer can be warmed up.

Another of the inventors' concepts relates to a power generation system comprising a diesel engine, a large channel combustor, a fuel reformer, and a lean $NO_X$ trap configured in that order with respect to the exhaust flow. The large channel combustor has an average channel size larger than that of the fuel reformer, a thermal mass no more than about 20% that of the fuel reformer, and an oxidation catalyst washcoat at least 50% thicker and providing at least 50% more catalyst per unit surface area than an oxidation catalyst-containing washcoat of the fuel reformer. The large channel combustor is able to accelerate the fuel reformer heating rate in comparison to a system without the large channel combustor.

A further concept of the inventors' relates to a method of operating a power generation system comprising operating a diesel engine to produce a lean exhaust containing $NO_X$, passing the exhaust sequentially through a large channel combustor, a fuel reformer, and then a lean $NO_X$ trap that adsorbs a portion of the $NO_X$ from the exhaust. From time-to-time, the lean $NO_X$ trap is denitrated by steps comprising: in a lean warm-up phase, heating the fuel reformer to steam reforming temperatures by introducing vaporized fuel to the large channel combustor and combusting a portion of the vaporized fuel in the large channel combustor; after the fuel reformer has heated to steam reforming temperatures, increasing the rate of fuel introduction and/or decreasing the exhaust oxygen flow rate to make the exhaust-injected fuel mixture overall rich, whereby the fuel reformer produces syn gas that denitrates the lean $NO_X$ trap. The fuel reformer has a low thermal mass, whereby it is designed to heat to at least about 500° C. and catalyze steam reforming reaction with each denitration of the lean $NO_X$ trap. The large channel combustor has an average channel size larger than an average channel size of the fuel reformer and a thermal mass no more than about 20% that of the fuel reformer, whereby the large channel combustor facilitates low temperature startup of the fuel reformer.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
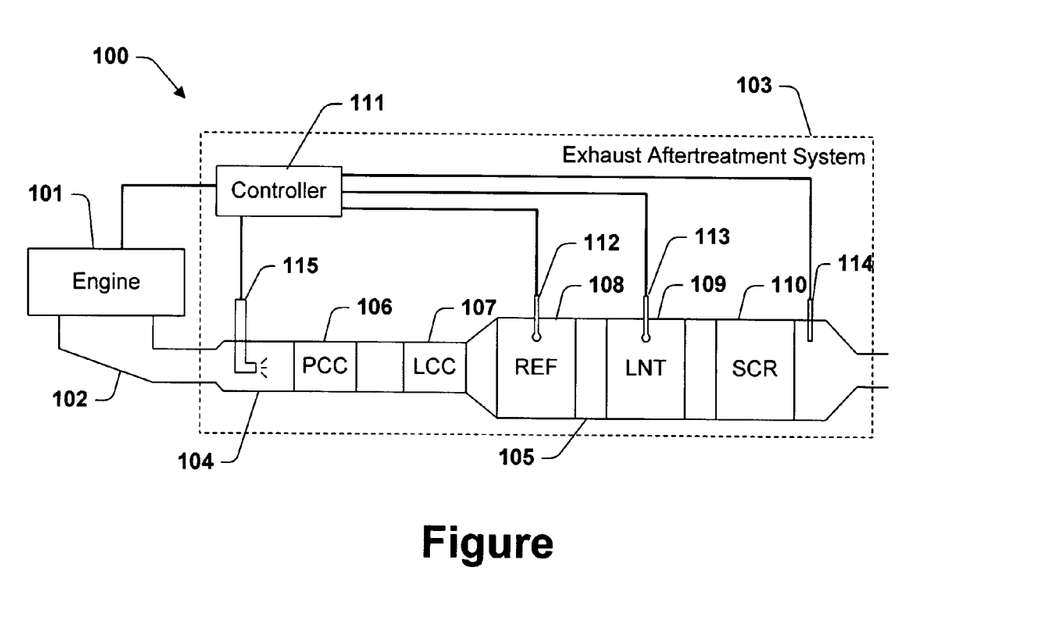
The FIGURE is a schematic illustration of an exemplary power generation system according to the inventors' concept.

The FIGURE is a schematic illustration of a power generation system 100 in which various of the inventors' concepts are implemented. The power generation system 100 is not the only power generation system to which the inventors' concepts are applicable, but the various concepts described herein were originally developed for systems like the system 100 and the individual components of the system 100 pertain to preferred embodiments. The power generation system 100 comprises an exhaust aftertreatment system 103 coupled to an engine 101 by an exhaust manifold 102. The exhaust aftertreatment system 103 comprises, a controller 111, a relatively narrow exhaust line 104 followed by a relatively wide exhaust line 105. Within the exhaust line 104 there are configured in order with respect to the direction of exhaust flow from the engine 101 a pre-combustion catalyst (PCC or pre-combustor) 106 and a large channel combustor (LCC) 107. The relatively narrow exhaust line 104 is coupled to the relatively wide exhaust line 105. Within the exhaust line 105 there are configured in order with respect to the direction of exhaust flow from the engine 101 a fuel reformer 108, a lean $NO_X$ trap 109, and an ammonia-SCR catalyst 110. A fuel injector 115 is configured to inject fuel into the exhaust line 104 upstream from the pre-combustor 106.

A controller 111 controls the fuel injection. An $NO_X$ sensor 114 can be provided in the exhaust line 105 downstream from the lean $NO_X$ trap 109 to assist the controller 111 in making the decision to initiate an operation involving fuel injection, such as denitration. One or more temperature sensors 112 may be provided to assist in controlling the fuel injection. The rate of fuel injection can be controlled based on information about the engine 101 and estimated or measured temperatures of the PCC 106, the LCC 107, or the fuel reformer 108. A temperature sensor 113 may be configured to measure the temperature of the lean $NO_X$ trap 109, which is particularly important during desulfation. The controller 111 can be an engine control unit (ECU) or a separate device.

It can be difficult to place a durable temperature sensor inside a device such as the fuel reformer 108 and it may be advantageous to position a temperature sensor, such as the temperature sensor 112, in the exhaust line immediately upstream or downstream from a device the temperature of which is being used in a control algorithm. Upstream temperatures are useful in model based control. Downstream temperatures can be used to infer upstream device temperatures using a model or by assuming thermal equilibrium between the device and the exhaust.

The engine 101 is preferably a compression ignition diesel engine. A compression ignition diesel engine normally produces exhaust having from about 4 to about 21% $O_2$. The engine 101 is commonly provided with an exhaust gas recirculation (EGR) system and may also be configured with an intake air throttle, either of which can be used to reduce the exhaust oxygen concentration and lessen the amount of reductant required to produce an overall rich exhaust-reductant mixture. A lean burn gasoline engine or a homogeneous charge compression ignition engine can be used as the engine 101. The engine 101 is operative to produce an exhaust that comprises $NO_X$, which is considered to consist of NO and $NO_2$.

The exhaust from the engine 101 is channeled by the manifold 102 to the exhaust line 104. The exhaust line 104 and the exhaust line 105 are essentially one exhaust line having a varying cross section. While the exhaust lines 104 and 105 can be configured as several parallel channels, preferably the are configured as single channels. Preferably, the exhaust line 104, and therefore the PCC 106 and the LCC 107, have a cross-section that allows them to fit in the space provided for a conventional exhaust line. This corresponds to about 50 or less $cm^2$ of cross-sectional area per liter engine displacement, more preferably about 25 or less, still more preferably about 15 or less.

The exhaust lines 104 and 105 are preferably configured without exhaust valves or dampers. In particular, the exhaust lines 104 and 105 are preferably configured without valves or dampers that could be used to vary the flow of exhaust to the LNT 109. The inventors' concepts are applicable to aftertreatment systems with exhaust valves or dampers, but the present invention has greater applicability to systems without valves or dampers that could be used to protect the fuel reformer 108 from unfavorable exhaust conditions and facilitate heating. In any event, it is preferred that the exhaust lines 104 and 105 be configured without valves or dampers because these moving parts are subject to failure and can significantly decrease the durability and reliability of an exhaust aftertreatment system.

Even when the exhaust lines 104 and 105 are free from exhaust valves or dampers, an exhaust line upstream from the engine 101 may still have an exhaust gas recirculation (EGR) valve in an EGR line. Exhaust valves are particularly problematic when they are configured within a main exhaust line to divert a majority of the exhaust flow as compared to exhaust valves configured to control the flow through a side branch off a main exhaust line. Exhaust valves for larger conduits are more subject to failure than exhaust valves for smaller conduits.

The exhaust line 104 is provided with an exhaust line fuel injector 115 to create rich conditions for regenerating the LNT 109. The inventors' concepts are applicable to other method's of creating a reducing environment for regenerating the LNT 109, including engine fuel injection of reductant and injection of reductants other than diesel fuel. Nevertheless, it is preferred that the reductant is the same diesel fuel used to power the engine 101. It is also preferred that the reductant be injected into the exhaust line 104, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 104, and forming deposits on any EGR valves.

The fuel injector 115 injects the reductant into the exhaust line 104 upstream from the pre-combustor 106. Preferably the fuel injector 115 sprays the fuel directly onto a front face of the pre-combustor 106, as this has been found to result in a lower light-off temperature for the pre-combustor 106. The function of the pre-combustor 106 is to vaporize injected fuel using energy produced by combusting a small portion of the injected diesel fuel. The vaporized fuel can be intimately mixed with the exhaust much more easily than un-vaporized fuel. A mixing zone, which is a short length of pipe optionally containing baffles or the like, is preferably provided downstream of the pre-combustor 106 and upstream of the large channel 107.

The pre-combustor 106 preferably comprises a monolith substrate with an oxidation catalyst washcoat. Examples of suitable oxidation catalysts for the pre-combustor 106 include Pt and Pd. It may be desirable to coat only a portion of the pre-combustor channels, from 20-80% for example, with the oxidation catalyst. The pre-combustor 106 is preferably functional to light-off at a low exhaust temperature. Examples of low exhaust temperatures at which the pre-combustor 106 could be designed to light-off include about 215° C., about 200° C., and as low as about 190° C.

Different definitions of light-off temperature and light-off are used in different fields. In exhaust aftertreatment, light-off temperature is defined in terms of the exhaust temperature provided to the device. Light-off temperature is the minimum exhaust temperature from which the device provided with an exhaust stream containing appropriate constituents will heat itself substantially by combusting the exhaust system constituents. At the light-off temperature, the device will heat itself to a point at which it provides a satisfactory degree of conversion.

The large channel combustor 107 is configured in the exhaust line 104 downstream of the pre-combustor 106 following a mixing zone. The large channel combustor also includes a monolith substrate with an oxidation catalyst washcoat. Any suitable catalyst can be used, but Pd supported on an alumina-lanthanum washcoat is preferred. The $La_2O_3$ is preferred provided over the surface of the alumina in an amount sufficient to provide at least about a monolayer, e.g., from about 5 to about 20% by weight alumina. The Pd is preferably provided in an amount from about 10 to about 20% by weight alumina. The Pd can be co-deposited with the La or deposited as a coating over the La.

Whereas the pre-combustor 106 is designed to combust only a small fraction of the injected fuel and to heat the exhaust to a relatively small extent, the large channel combustor 107 is designed to combust the fuel and heat the exhaust to a substantially greater extent, whereby after light-off the large channel combustor 107 heats the exhaust to a degree that significantly accelerates the warm-up of the downstream fuel reformer 108. The large channel combustor 107 will be described in greater detail below after the overview of the exemplary power generation system 100 and it mode of operation has been completed.

The fuel reformer 108 comprises an effective amount of precious metal catalyst, usually including rhodium, to catalyze oxidation and steam reforming reactions at 600° C. The fuel reformer 108 is designed with low thermal mass, whereby it can be easily heated to steam reforming temperatures for each LNT regeneration. Low thermal mass is typically achieved by constructing the fuel reformer 108 around a thin metal substrate. A thin metal substrate has a thickness that is about 100 μm or less, preferably about 50 μm or less, and still more preferably about 30 μm or less.

Steam reforming temperatures are at least about 500° C., which is generally above diesel exhaust temperatures. Diesel exhaust temperatures downstream from a turbocharger vary from about 110 to about 550° C. Preferably, the fuel reformer 108 comprises enough steam reforming catalyst that at 600° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

The fuel reformer 108 preferably comprises separate oxidation and steam reforming catalyst sections. It has been found most effective to provide an oxidation catalyst washcoat on an upstream portion of the fuel reformer 108 and a steam reforming catalyst washcoat on a downstream portion of the fuel reformer 108. The oxidation catalyst washcoat can be the same as that described above with reference to the large channel combustor. A preferred reforming catalyst is Rh supported on a zirconium-lanthanum washcoat. The $La_2O_3$ is preferred provided over the surface of the zirconium in an amount sufficient to provide at least about a monolayer, e.g., from about 2.5 to about 10% by weight zirconium. The Rh is preferably provided in an amount from about 0.1 to about 1% by weight zirconium. Preferably, the reforming washcoat contains about 0.5% or less precious metal by weight zirconium, as sintering can substantially diminish the effectiveness of the Rh if higher concentrations are provided. The oxidation and catalyst washcoats can be separate or overlapping.

The reformer 108 is primarily intended to assist in the regeneration of the LNT 109, which is configured downstream from the fuel reformer 108. It may be desirable to provide a relatively large thermal mass, such as a diesel particulate filter (DPF) or an inert monolith substrate between the fuel reformer 108 and the LNT 109 to protect the LNT 109 from undergoing large temperature excursions each time the fuel reformer 108 is operated to denitrate the LNT 109.

An LNT is a device that adsorbs $NO_X$ under lean conditions and reduces and releases $NO_X$ under rich conditions. An LNT generally comprises a $NO_X$ adsorbent and a precious metal catalyst in intimate contact on an inert support. Examples of $NO_X$ adsorbent materials include certain oxides, carbonates, and hydroxides of alkaline earth metals such as Mg, Ca, Sr, and Ba or alkali metals such as K or Cs. The precious metal typically consists of one or more of Pt, Pd, and Rh. The support is typically a monolith, although other support structures can be used. The monolith support is typically ceramic, although other materials such as metal and SiC are also suitable for LNT supports. The LNT 109 may be provided as two or more separate bricks.

The ammonia-SCR catalyst 110 is functional to catalyze reactions between $NO_X$ and $NH_3$ to reduce $NO_X$ to $N_2$ in lean exhaust. The ammonia-SCR catalyst 110 adsorbs $NH_3$ released from the LNT 109 during denitration and subsequently uses that $NH_3$ to reduce $NO_X$ slipping from the LNT 109 under lean conditions. Examples of ammonia-SCR catalysts include certain oxides of metals such as Cu, Zn, V, Cr, Al, Ti, Mn, Co, Fe, Ni, Mo, W, and Ce and zeolites, such as ZSM-5 or ZSM-11, substituted with metal ions such as cations of Cu, Co, Ag, or Zn. Ammonia-SCR can be accomplished using precious metals, but preferably the SCR catalyst 110 is substantially free of precious metals. Preferably, the ammonia-SCR catalyst 110 is designed to tolerate temperatures required to desulfate the LNT 109.

The exhaust aftertreatment system 100 can comprise other components, such a diesel particulate filter (DPF) and a clean-up oxidation catalyst. A thermal mass, such as a DPF or an inert monolith, can be placed between the fuel reformer 108 and the LNT 109 to prevent the LNT 109 from heating excessively each time the fuel reformer 108 is operated.

During normal operation (a lean phase), the engine 101 is operated to produce an exhaust comprising $NO_X$ and excess oxygen. A portion of the $NO_X$ is adsorbed by the LNT 109. The ammonia-SCR catalyst 110 may have ammonia stored from a previous denitration of the LNT 109. If the ammonia-SCR catalyst 110 contains stored ammonia, an additional portion of the $NO_X$ is reduced over the ammonia-SCR catalyst 110 by reaction with stored ammonia. The fuel injector 115 is generally inactive over this period.

From time-to-time, the LNT 109 must be regenerated to remove accumulated $NO_X$ (denitrated) in a rich phase. Denitration generally involves heating the reformer 108 to an operational temperature and then using the reformer 108 to produce reformate. The reformer 108 is generally heated by injecting fuel into the exhaust upstream from the pre-combustor 106 at a sub-stoichiometric rate, whereby the exhaust-reductant mixture remains overall lean. This may be referred to as a lean warm-up phase. Once combustion has heated the reformer 108, the fuel injection rate can be increased and/or the exhaust oxygen flow rate reduced to make the exhaust-reductant mixture overall rich, whereupon the pre-combustor 106, the large channel combustor 107, and the fuel reformer 108 consume most of the oxygen from the exhaust and the fuel reformer 108 produces reformate by partial oxidation and/or steam reforming reactions. The reformate thus produced reduces $NO_X$ absorbed in the LNT 109. Some of the NO$_X$ may be reduced to NH$_3$, which is absorbed and stored by the ammonia-SCR catalyst 110.

The controller 111 schedules denitration of the LNT 109 based on criteria relating to the state and or performance of the exhaust aftertreatment system 103 or a component thereof comprising the LNT 109. Criteria for scheduling denitration of the LNT 109 denitration may be based on NO$_X$ loading of the LNT 109. Loading of the LNT 109 can be characterized in terms of amount of NO$_X$ accumulated, remaining NO$_X$ storage capacity, percent saturation, or another parameter of this type. Numerous methods for estimating NO$_X$ loading and/or remaining NO$_X$ storage capacity have been proposed. These methods generally involve integrating an estimate of the NO$_X$ storage rate and comparing the result to an estimated NO$_X$ storage capacity.

NO$_X$ storage rates can be estimated from differences between NO$_X$ flow rates out of the engine 101 and NO$_X$ flow rates out of the LNT 109 or by multiplying NO$_X$ flow rates out of the engine 101 by estimates of the NO$_X$ trapping efficiency of the LNT 109. Engine out NO$_X$ flow rates can be estimated exclusively from engine operating maps or using a NO$_X$ sensor in the exhaust upstream from the LNT 109. NO$_X$ flow rates out of the LNT 109, when used, are generally estimated using NO$_X$ concentration sensors, such as the sensor 114.

Other criteria that can be used to schedule denitration include criteria that relate to current performance of the aftertreatment system 103, or a portion thereof comprising the LNT 109, as determined from NO$_X$ concentration measurements taken downstream from the LNT 109. These measurements can be used on a standalone basis, regenerating when the downstream concentration exceeds a critical value, or in combination of with estimates of NO$_X$ concentration upstream from the LNT 109, whereby the LNT performance efficiency can be determined and used as a criteria. The performance of the LNT 109 can be determined individually, or the performance of the LNT 109 in combination with another device, such as an SCR reactor 110, can be measured.

From time to time, the LNT 109 must also be regenerated to remove accumulated sulfur compounds (desulfated). Desulfation involves heating the fuel reformer 108 to an operational temperature, heating the LNT 109 to a desulfating temperature, and providing the heated LNT 109 with a rich atmosphere. Desulfating temperatures vary, but are typically in the range from about 500 to about 800° C., with optimal temperatures typically in the range of about 650 to about 750° C. Below a minimum temperature, desulfation is very slow. Above a maximum temperature, the LNT 109 may be damaged.

The LNT 109 can be warmed by heat convection from the reformer 108. To generate this heat, fuel can be injected into the exhaust line 4 at a rate that leaves the exhaust overall lean, whereby fuel combusts in the pre-combustor 106, the large channel combustor 107, and the fuel reformer 108. Once the reformer 108 is heated, the fuel injection rate can be controlled to maintain the temperature of the reformer 108 while the LNT 109 are heating. Heating of the LNT 109 can be augmented by pulsing fuel injection to cause combustion in the LNT 109. After the LNT 109 has heated sufficiently, the fuel injection rate can be increased to provide a rich atmosphere.

The inventors' concepts disclosed herein primarily relate to the performance of the exhaust aftertreatment system 103 at low exhaust temperatures. Even though the pre-combustor 106 lights off at a sufficiently low temperature, there are several ways in which its performance may be inadequate in the absence of the large channel combustor 107. One potential problem is that the pre-combustor 106 may not heat the exhaust-fuel mixture enough to light-off the fuel reformer 108. Another potential problem is that the fuel reformer 108 may light off excessively slowly, resulting in poor response time to decisions to initiate denitration and high fuel penalty for the lean warm-up phase. A further potential problem is excessive hydrocarbon break-through over the course of the lean warm-up phase.

In general the fuel reformer 108 has a higher light-off temperature than the pre-combustor 106. If the exhaust is below the fuel reformer 108's light-off temperature, a certain amount of fuel combustion must take place upstream from the fuel reformer 108 in order for it to light off. Some fuel combustion will take place in the pre-combustor 106 provided the exhaust is above the pre-combustor 106's light-off temperature. Heat provided by this combustion is, by design, at least enough to vaporize all or most of the un-combusted fuel passing through the pre-combustor 106, but is not necessarily enough to also raise the exhaust-fuel mixtures' temperature to the fuel reformer 108's light-off temperature.

In principle, the pre-combustor 106 could be modified with additional catalyst, by extending its length for example, to achieve the required degree of additional combustion, however, it is preferable that this additional combustion take place downstream from the pre-combustor. Additional combustion within the pre-combustor would be undesirable in that damaging hot spots could develop due to the poor mixing of the fuel and exhaust provided to the pre-combustor 106. To avoid such hot spots, the pre-combustor 106 preferably does not heat the exhaust by more than about 100° C. More preferably, the pre-combustor 106 does not heat the exhaust by more than about 75° C., still more preferably no more than about 50° C.

Hot spots are not as much of an issue when additional combustion takes place in devices downstream from the pre-combustor 106. Vaporized fuel and exhaust are allowed to mix downstream from the pre-combustor 106. The resulting well-mixed composition combusts with greater uniformity. In addition, the vaporization and mixing reduces the amount of catalyst required to achieve a desired degree of combustion.

Even if the pre-combustor provides sufficient combustion to light off the fuel reformer 108, light-off can be excessively slow and result in a high fuel penalty for the lean warm-up phase. A slow light-off phase can require about 5 second or more, about 10 seconds or more, or even about 20 seconds or more. Over the light-off phase, a large quantity of exhaust may need to be heated. Heat carried past the fuel reformer 108 is generally wasted. In addition, a significant fraction of the hydrocarbon may not be combusted in the fuel reformer 108 or upstream thereof during the heat up of the reformer to the light off temperature. This hydrocarbon is wasted and adds to the fuel penalty.

Hydrocarbon slipping from the fuel reformer 108 during the lean warm-up phase is problematic in its own right, independent of its effect on fuel penalty. Incompletely combusted hydrocarbon is a pollutant that can escape to the environment. Hydrocarbon slipping from the fuel reformer 108 has also been associated with unreduced NO$_X$ release from the lean NO$_X$ trap 109. Finally, the SCR catalyst 110 is often susceptible to poisoning by hydrocarbons.

It is not immediately apparent how inserting an additional oxidation catalyst between the pre-combustor 106 and the fuel reformer 108 can solve any of these problems. It can be assumed that the fuel reformer 108 already has an oxidation catalyst and that the properties of this catalyst, including composition and washcoat thickness have already been optimized. Moreover, adding an additional catalyst upstream from the fuel reformer 108 increases the amount of mass that must be heated in order to achieve light-off of the fuel reformer 108. If additional catalyst were desired, it could be added by enlarging the fuel reformer 108.

One way in which the large channel combustor 107 improves over an additional catalyst section attached to the front of the fuel reformer 108 is by provided a comparatively small mass catalyst in thermal isolation from mass of the fuel reformer 108. Preferably the mass of the large channel combustor is about 20% or less that of the fuel reformer 108, more preferably about 10% or less that of the fuel reformer 108. The mass is effectively thermally isolated from that of the fuel reformer 108 by provide it on a separate substrate, which is typically a monolith structure separate from that of the fuel reformer 108.

Monolith substrates initially light off at the front end. When the exhaust is hotter than the monolith, the exhaust heats the monolith. Exhaust is gaseous and contains little heat capacity. As a result, the energy from the exhaust is rapidly drawn from the exhaust by the front end of the monolith. The downstream parts of the monolith do not receive much energy from the exhaust until the front end is heated to at least the exhaust temperature.

The temperature differences resulting from non-uniform heating by the exhaust are exaggerated by the effects of combustion reactions. Combustion reaction rates increase rapidly with temperature. Because the front end heats first, combustion is initially more rapid there, even if the combustion reagents are in excess throughout the monolith as opposed to diminishing significantly in concentration along the monolith length.

Non-uniform heating of the type described above is beneficial for the startup phase. Concentrating the heat at the front end provides more reaction than uniformly distributing the heat across the length of the monolith. More reaction early reduces the startup time, reduces the fuel penalty for start-up, and reduces hydrocarbon slip during start-up.

Heat conduction through the monolith substrate works against the above-described effects to redistribute the heat more uniformly. Axial heat conduction is often considered negligible in monolith reactor modeling, however long startup times enhance the significance of axial conduction. The large channel combustor 107 and the fuel reformer 108 typically have the thinnest walls that are practical in order to keep their thermal masses as low as possible, however, thinness is typically achieved by using metal walls, which have a high thermal conductivity.

Providing oxidation catalyst in the large channel combustor 107 reduces the effect of axial heat conduction in two ways. First, it has a substrate, typically a monolith "brick", physically separated and thereby insulated from that of the fuel reformer 108. Second, the large channel combustor 107 has a significantly lower axial thermal conductivity than the fuel reformer 108. The axial thermal conductivity is generally lower primarily due to a difference in cross-sectional area of the substrate metal through which heat conduction occurs. The cross sectional area is less because the channel density is lower while the channel wall thickness is generally the same. In additional, the aspect ratio of the large channel combustor 107 is preferably selected to provide a smaller frontal area than that of the fuel reformer 108. The frontal area of the large channel combustor is preferably about half or less that of the fuel reformer 108, more preferably one quarter or less. Conveniently, the frontal area can be maintained small enough for the large channel combustor 107 to fit within the cross-section provided for a conventional exhaust pipe. Both the reduced frontal area and the reduced channel density result in a small cross-section of metal through which axial heat conduction takes place.

Another way in which the large channel combustor 107 can improve over an additional catalyst section attached to the front of the fuel reformer 108 is through the effect of channel size on transport coefficients. Heat and mass transport coefficients between the fluid flowing through a monolith channel and the catalyst coating the monolith channel walls are inversely proportional to channel size. Narrow channels with their high mass transport coefficients are generally desirable in the fuel reformer 108. When the fuel reformer 108 is at its operating temperature, reaction rates are very high at the wall, whereby conversion may be limited by the rate of mass transport to the wall. The higher the mass transport rate, the smaller the catalyst volume requirement. A smaller catalyst volume translates to less expensive catalyst and less mass to warm-up.

High heat transfer coefficients also have a beneficial effect in the fuel reformer 108. Exothermic combustion reactions tend to occur more towards the entrance of the fuel reformer 108 in comparison to endothermic steam reforming reactions. Even if the fuel reformer 108 is operating overall auto-thermally, heat must be continuously carried from the front of the fuel reformer 108 toward the back of the fuel reformer 108. A temperature difference will develop to drive this transport of heat. The larger the transport coefficient, the smaller this difference will be. A uniform reformer temperature is desirable in terms of protecting the catalyst and in terms of using the catalyst with peak efficiency.

While high transport coefficients are desirable in the fuel reformer 108, relatively lower transport coefficients are preferable for the comparatively small amount of oxidation catalyst provided by the large channel combustor 107 in front of the fuel reformer 108. As the large channel combustor 107 heats to the temperature of the exhaust, the low heat transport coefficient is something of a disadvantage, although not too great if most of the heat from the exhaust is still taken up by the large channel combustor 107. As the large channel combustor 107 begins to exceed the exhaust temperature, the low heat transfer coefficient becomes an advantage. As the wall heats above the exhaust temperature due to reactions at the wall, reaction rates are still comparatively low and reductant is available in excess. The rate of heating is lessened by heat loss to the exhaust. Reducing the rate of heat loss to the exhaust increases the wall heating rate. Eventually, the wall heats enough that the negative impact of the reduced mass transport coefficient becomes significant, but at such a time the conversion rate is sufficiently high for the purposes of the large channel combustor 107. Overall, the reduced transport coefficients allow the large channel combustor to reach a high conversion rate earlier than would result if the transport coefficients were as high as those of the fuel reformer 108.

While comparatively low transport coefficients are desirable for the large channel combustor 107, they should not be excessively low. Typically, between about one half and one quarter that of the fuel reformer 108 is desirable. The heat transfer coefficient is proportional to the hydraulic diameter for passages having similar cross section. Whereas a typical channel hydraulic diameter for the fuel reformer 108 is from about 1.0 to about 1.5 mm, preferred channel hydraulic diameters for the large channel combustor 107 are typically from about 3 mm to about 12 mm, more preferably from about 3.5 mm to about 6 mm.

Another way in which the large channel combustor 107 can improve over an additional catalyst section attached to the front of the fuel reformer 108 is by providing a higher concentration of active oxidation catalyst per unit surface area than is used in the fuel reformer. The concentration is preferably increased by providing a thicker washcoat. While in principal it is possible to provide a higher concentration of active catalyst by providing a higher concentration in the washcoat, in practice it is generally not possible in that the concentration within the washcoat is typically already maximized. Only surface atoms are active for catalysis. As catalyst concentrations increase, the catalyst becomes more susceptible to sintering. Sintering is a growth of catalyst particles, which results in a reduction in surface area. Cycling between lean and rich conditions at high temperature makes the catalysts of the exhaust aftertreatment system 103 particularly susceptible to sintering.

The washcoat in the fuel reformer 108 is generally made thick until a point of substantially diminished or even negative returns is reached. As the washcoat is progressively thickened, the benefit of the additional surface area becomes offset to a progressively greater degree as the monolith passage surface area is reduced by the washcoat layer. Perhaps more importantly, diffusion through the washcoat becomes a rate limiting step, whereby the additional thickness provides little benefit while significantly increasing cost.

While a thicker washcoat may provide little benefit in comparison to the cost if the thick washcoat is applied to the fuel reformer 108, a thicker washcoat can provide a substantial benefit and be cost effective if applied to the large channel combustor 107. During the early stages of heating, combustion rates are low and diffusional limitations are less significant. Accordingly, the additional washcoat thickness is effective to accelerate the early stages of the warm-up phase, which are the critical ones for the large channel combustor 107's function. Due to the greater channel diameter, the passage narrowing effect of the thicker washcoat is not significant. Because the total surface area of the large channel combustor 107 is much less than that of the fuel reformer 108, the cost of thickening its washcoat is much less. Preferably, the oxidation catalyst washcoat of the large channel combustor is at least about 50% thicker that then oxidation catalyst washcoat of the fuel reformer 108, more preferably at least about twice as thick, and optionally at least about four times as thick.

Over the course of a denitration, including a lean warm-up phase, on the order of about 10 g of hydrocarbon may be injected into the exhaust line 104. Preferably, the system 100 is operative to limit the amount of this injected hydrocarbon slipping past the LNT 109 as unburned hydrocarbon (UHC) to about 25% of the injected amount or less even when the exhaust temperature is relatively low. The system 100 is preferably adapted to meet this UHC limit down to exhaust temperatures of 250° C., more preferably about 210° C., and still more preferably down to about 190° C. Tailpipe emissions of UHC can be further limited with a clean-up oxidation catalyst. The amount of UHC slip will depend on the exhaust flow rate. In general, exhaust flow rates are low when exhaust temperatures are low, which facilitates meeting these targets. Low end exhaust flow rates for the system 100 are used in evaluating whether these targets are met.

Preferably injected fuel undergoes no more than about 90% conversion in large channel combustor 108 under low flow lean conditions at 400° C., more preferably no more than about 70%. The exhaust flow rate at idle typifies the low flow condition. The conversion can be limited by limiting the mass transfer rate, which is a function of both the mass transfer coefficient and surface area of the large channel combustor 108. When the conversion rate is mass transfer limited, the conversion rate is only weakly temperature-dependent, but still a function of exhaust flow rate. At high flow rates, the conversion will be even less than at low flow rates. It is desirable to limit the amount of combustion that takes place in the large channel combustor 108, because some of the heat from combustion is used in the reformer 109 to drive steam reforming reactions. Having combustion and steam reforming take place in close proximity facilitates having the one process utilize the heat generated by the other, reduces peak temperatures, and may increases the amount of steam reforming that takes place. Once heated, the LCC 107 typically combusts at least about 30% of the fuel it receives.

As described above, when the decision is made to dose fuel to the exhaust, for example to denitrate the LNT 109, the reformer 108 is heated in a lean warm-up phase. As long as the reformer 108 is below its light-off temperature, the fuel injection is preferably controlled based on the operation of the PCC 106 and the LCC 107.

In an exemplary control system, a target fuel injection rate is set as a function of a temperature and an exhaust flow rate. The target fuel injection rate can be expressed in terms of exhaust fuel-air ratio, adiabatic combustion temperature of the exhaust-fuel mixture, or target rate of temperature rise exhaust treatment device temperature rise. The target is set to provide the fastest warm-up rate subject to a limit on the amount of hydrocarbon slip that will be tolerated. The temperature can be a measured or estimated temperature of the PCC 106, the LCC 107, or the exhaust upstream or downstream of one of these devices. In a preferred embodiment, the temperature is determined from a model that lumps the PCC 106 and LCC 107 into a single thermal mass and assumes equilibrium, between the temperature of that mass and the exhaust. The model includes a fuel conversion rate that is a function of exhaust flow rate and temperature. Once the mass has heated to a light-off temperature of the fuel reformer 108, the fuel injection control can switch to one based on the fuel reformer 108's warm-up and fuel breakthrough characteristics. Once the fuel reformer 108 has heated to steam reforming temperatures, fuel injection control switches to provide syn gas production under overall rich conditions.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:
1. A power generation system, comprising:
a diesel engine operative to produce exhaust;
a fuel injector configured to inject fuel into the exhaust;
a pre-combustor comprising an oxidation catalyst and configured to receive a stream of the exhaust together with fuel injected by the fuel injector;
a large channel combustor comprising an oxidation catalyst in a washcoat and configured to receive the exhaust stream from the pre-combustor;
a fuel reformer comprising a fuel reforming catalyst and configured to receive the exhaust stream from the large channel combustor; and
a lean $NO_x$ trap configured to receive the exhaust stream from the fuel reformer;
wherein the pre-combustor is operative to combust a first portion of the injected fuel and to vaporize another portion of the injected fuel;

the system is configured to mix the exhaust and vaporized fuel between the pre-combustor and the large channel combustor;

the large channel combustor has an average channel size larger than an average channel size of the fuel reformer and a thermal mass no more than about 20% that of the fuel reformer;

the fuel reformer is operative to from an effective amount of $H_2$ and CO for denitrating the lean $NO_x$-trap when the exhaust-fuel stream from the large channel combustor is overall rich;

wherein the fuel reformer has a low thermal mass, whereby it is designed to heat to at least about 500° C. and catalyze steam reforming reaction with each denitration of the lean $NO_x$ trap; and the lean $NO_x$ trap is functional to adsorb and store $NO_x$ from the exhaust stream when the exhaust stream is overall lean and to reduce and release stored $NO_x$ when the exhaust stream is overall rich.

2. The power generation system of claim 1, wherein the large channel combustor has a thermal mass no more than about 10% that of the fuel reformer.

3. The power generation system of claim 1, wherein the large channel combustor is configured with an electrical heater.

4. The power generation system of claim 1, wherein the fuel reformer has distinct oxidation and reforming catalyst sections.

5. he power generation system of claim 1, wherein the large channel combustor has a frontal area not more than about half the frontal area of the fuel reformer.

6. The power generation system of claim 1, wherein the large channel combustor has a frontal area of about 25 or less $cm^2$ per liter displacement of the diesel engine.

7. The power generation system of claim 1, wherein;

the system is operative to produce exhaust that enters the pre-combustor at about 215° C.;

the pre-combustor is operative under this condition to combust a portion of the injected fuel and vaporize a remaining portion of the injected fuel, but is not operative under this condition to heat the exhaust fuel mixture above about 315° C.; and the large channel combustor is operative under this condition to heat rapidly by combusting the mixed exhaust and fuel from the pre-combustor and, once heated, to combust enough of the fuel to heat the exhaust fuel mixture to at least about 400° C. prior to entering the fuel reformer.

8. The power generation system of claim 1, wherein:

the fuel reformer comprises an oxidation catalyst; and the large channel combustor has a higher concentration of oxidation catalyst per unit surface area than does the fuel reformer.

9. The power generation system of claim 8, wherein the large channel combustor has a catalyst washcoat at least about 50% thicker than a washcoat containing the oxidation catalyst in the fuel reformer.

10. A method of operating a power generation system, comprising:

operating a diesel engine to produce a lean exhaust comprising $NO_x$;

passing the lean exhaust sequentially through a large channel combustor, a fuel reformer, and then a lean $NO_x$ trap that adsorbs a portion of the $NO_x$ from the exhaust;

from time-to-time, denitrating the lean $NO_x$ trap by steps comprising:

in a lean warm-up phase, heating the fuel reformer to steam reforming temperatures by introducing vaporized fuel to the large channel combustor and combusting a portion of the vaporized fuel in the large channel combustor;

after the fuel reformer has heated to steam reforming temperatures, at least one of increasing the rate of fuel introduction and decreasing the exhaust oxygen flow rate to make the exhaust-injected fuel mixture overall rich, whereby the fuel reformer produces syn gas that denitrates the lean $NO_x$ trap;

wherein the large channel combustor has an average channel size larger than an average channel size of the fuel reformer and a thermal mass no more than about 20% that of the fuel reformer;

the fuel reformer has a low thermal mass, whereby it is designed to heat to at least about 500° C. and catalyze steam reforming reaction with each denitration of the lean $NO_x$ trap;

the lean $NO_x$ trap is functional to adsorb and store $NO_x$ from the exhaust stream when the exhaust stream is overall lean and to reduce and release stored $NO_x$ when the exhaust stream is overall rich;

the fuel reformer comprises an oxidation catalyst; and the large channel combustor has a higher concentration of oxidation catalyst per unit surface area than the fuel reformer.

11. The method of claim 10, wherein with the exhaust at 250° C. at least 75% of the fuel provided to warm-up the fuel reformer and regenerate the LNT is combusted prior to leaving the LNT.

12. The method of claim 10, wherein the large channel combustor heats at least twice as quickly as the fuel processor during the lean warm-up phase and, once heated, heats the exhaust stream to the fuel processor to at least about 400° C.

13. The method of claim 10, wherein the large channel combustor has a catalyst washcoat at least about 50% thicker than a washcoat containing the oxidation catalyst in the fuel reformer.

14. The method of claim 10, further comprising electrically heating the large channel combustor immediately prior to or during the lean warm-up phase.

15. The method of claim 10, wherein the fuel reformer has distinct oxidation and reforming catalysts.

16. The method of claim 10, wherein the large channel combustor has a frontal area not more than about half the frontal area of the fuel reformer.

17. The method of claim 10, wherein the large channel combustor has a frontal area of about 25 or less $cm^2$ per liter displacement of the diesel engine.

18. The method of claim 10, wherein the large channel combustor heats during the lean warm-up phase and once heated is functional to oxidize at least about 30% of the fuel it receives.

19. The method of claim 18, wherein mass transfer limitations prevent the large channel combustor from combusting more than about 90% of the fuel it receives.

20. The method of claim 10, further comprising:

passing the exhaust through a pre-combustor prior to passing the exhaust through the large channel combustor; and providing vaporized fuel to the large channel combustor by introducing fuel into the exhaust and partially vaporizing the fuel in the pre-combustor.

21. The method of claim 20, wherein:

over the course of the lean warm-up phase the exhaust enters the pre-combustor at a temperature of about 215° C. or less;

the pre-combustor is operative with the exhaust at this temperature to combust a portion of the injected fuel and vaporize a remaining portion of the injected fuel, but is not operative under this condition to heat the exhaust fuel mixture above about 315° C.; and the large channel combustor is operative with the exhaust entering the pre-combustor at this temperature to heat rapidly by combusting the mixed exhaust and fuel from the pre-combustor and, once heated, to combust enough of the fuel to heat the exhaust fuel mixture to at least about 400° C. prior to entering the fuel reformer.

22. A power generation system, comprising:

a diesel engine operative to produce exhaust;

a large channel combustor comprising a monolith substrate with an oxidation catalyst washcoat and configured to receive an exhaust stream from the engine;

a fuel reformer comprising a monolith substrate and at least one oxidation catalyst in a washcoat and at least one steam reforming catalyst and configured to receive the exhaust stream from the large channel combustor; and a lean $NO_x$ trap configured to receive the exhaust stream from the fuel reformer;

wherein the large channel combustor monolith has an average channel size larger than that of the fuel reformer monolith;

the large channel combustor monolith has a thermal mass no more than 20% that of the fuel reformer monolith;

the washcoat of the large channel combustor is at least 50% thicker and provides at least 50% more catalyst per unit channel surface area than the washcoat of the fuel reformer;

the fuel reformer is operative to form an effective amount of $H_2$ and CO for denitrating the lean $NO_x$-trap when the exhaust-fuel stream from the large channel combustor is overall rich;

wherein the fuel reformer has a low thermal mass, whereby it is designed to heat to at least about 500° C. and catalyze steam reforming reaction with each denitration of the lean $NO_x$ trap; and the lean $NO_x$ trap is functional to adsorb and store $NO_x$ from the exhaust stream when the exhaust stream is overall lean and to reduce and release stored $NO_x$ when the exhaust stream is overall rich.

23. The power generation system of claim 22, wherein the large channel combustor has a thermal mass no more than about 10% that of the fuel reformer.

24. The power generation system of claim 22, wherein the large channel combustor is configured with an electrical heater.

25. The power generation system of claim 22, wherein at the large channel combustor's channel size and dimensions are such that its mass transfer coefficient limits its conversion of diesel fuel to 90% or less under typical exhaust flow rates for the power generation system.

26. The power generation system of claim 22, wherein the fuel reformer has distinct oxidation and reforming catalysts.

27. The power generation system of claim 22, wherein the large channel combustor has a frontal area not more than about half the frontal area of the fuel reformer.

28. The power generation system of claim 22, wherein the large channel combustor has a frontal area of about 25 or less $cm^2$ per liter displacement of the diesel engine.

* * * * *